United States Patent [19]

Pays

[11] 4,450,555
[45] May 22, 1984

[54] DEVICE FOR MINIMIZING FAR-END CROSSTALK BETWEEN HALF-DUPLEX DIGITAL TRANSMISSION LINES

[76] Inventor: Gérard J. P. Pays, Chemin de Toul-ar-laan, Perros-Guirec, France, 22700

[21] Appl. No.: 309,512

[22] Filed: Oct. 7, 1981

[30] Foreign Application Priority Data

Oct. 8, 1980 [FR] France ............................ 80 21483

[51] Int. Cl.³ ............................................. H04B 1/44
[52] U.S. Cl. .......................................... 370/31; 370/6; 375/7; 375/11
[58] Field of Search .................. 370/31, 6, 29; 375/7, 375/8, 11, 12

[56] References Cited

U.S. PATENT DOCUMENTS 3,958,082  5/1976  Huellwegen ........................ 370/31

OTHER PUBLICATIONS

K. Tanaka et al., Studies on Digitalization of Subscriber Loop Transmission System, NTG Gachberichte, pp. 86–90, vol. 73, 1980, ISSLS 80, "The International Symposium on Subscriber Loops and Services", Sep. 15–19, 1980, Munich.

Primary Examiner—Douglas W. Olms
Attorney, Agent, or Firm—Lowe, King, Price & Becker

[57] ABSTRACT

The invention is intended to eliminate the far-end crosstalk effects between transmission lines grouped together in one link by employing filtering means already introduced into the receiving channel of a terminal or intermediate station of a half-duplex transmission line. The far-end crosstalk minimizing device is included in a half-duplex digital transmission station linked to a line section whose other end is a grouping point for the lines and which produces an attenuation less than a maximum attenuation. It comprises an equalizing circuit and switches. The equalizing circuit is included in the receiving channel of the station and includes a filter having a transfer gain practically equal to the difference between the attenuation of the line section and the maximum attenuation. The switches introduce the filter in series into the transmitting channel of the station during each transmission operation of the half-duplex station cycle.

11 Claims, 9 Drawing Figures

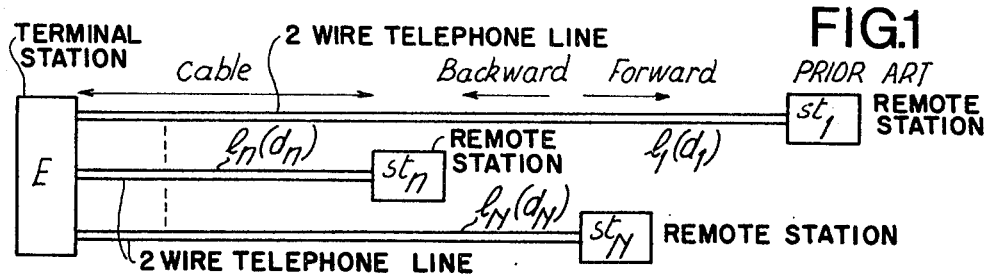
FIG.1 PRIOR ART
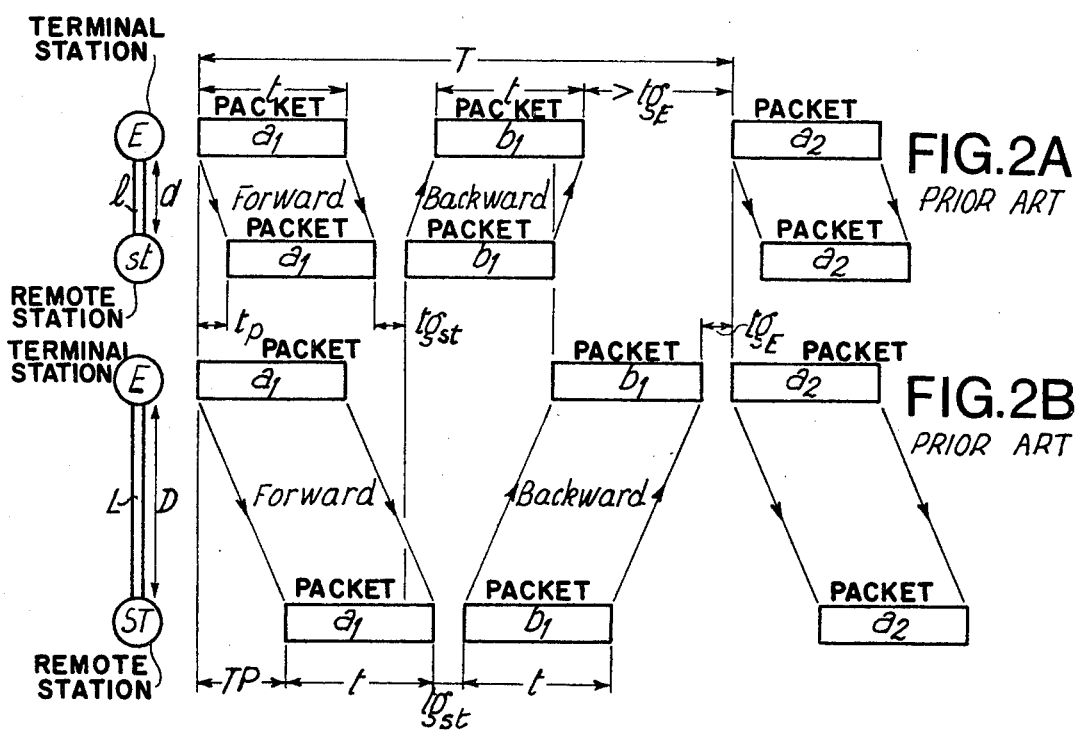
FIG.2A PRIOR ART
FIG.2B PRIOR ART
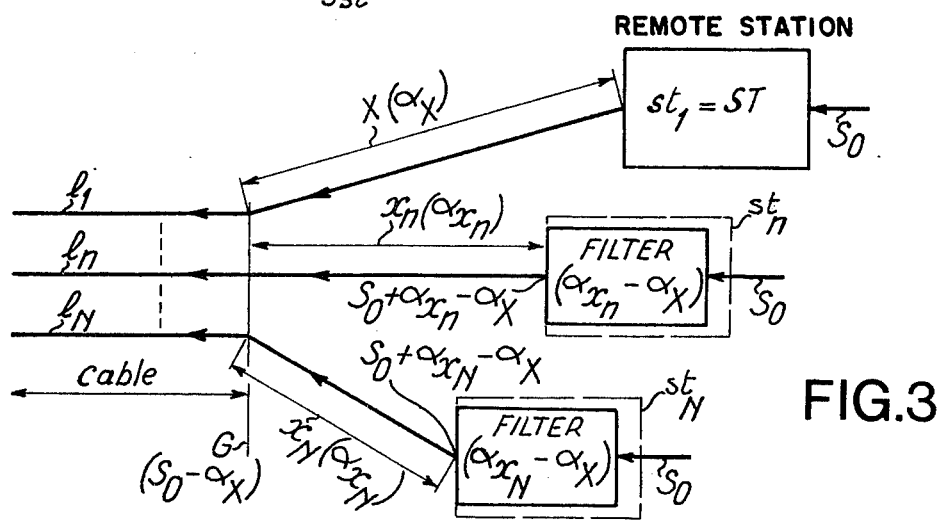
FIG.3

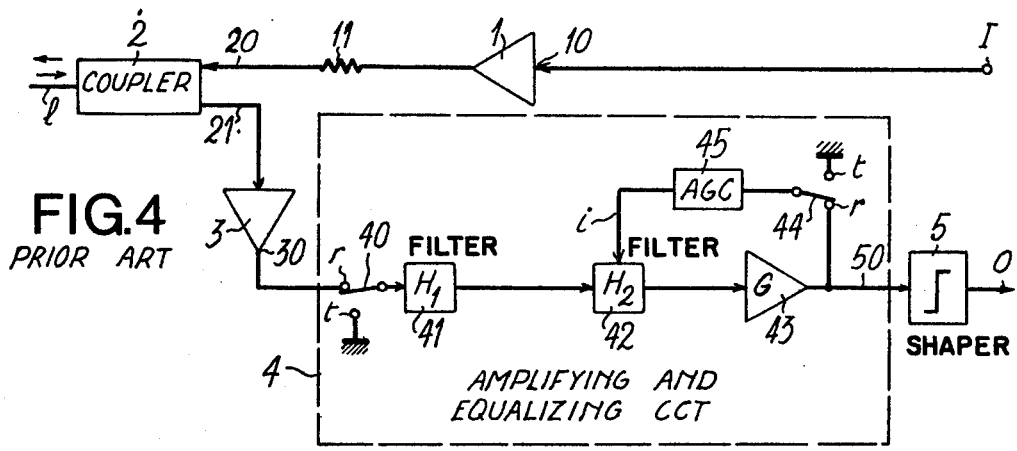
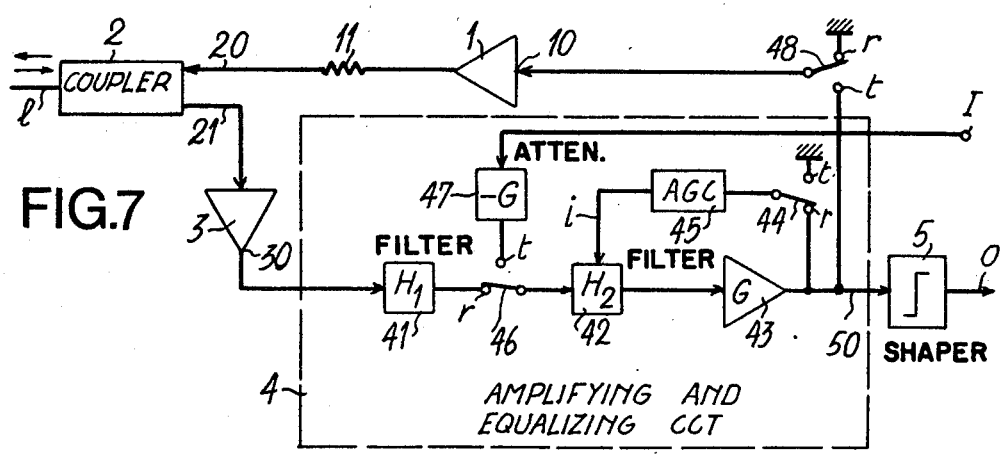
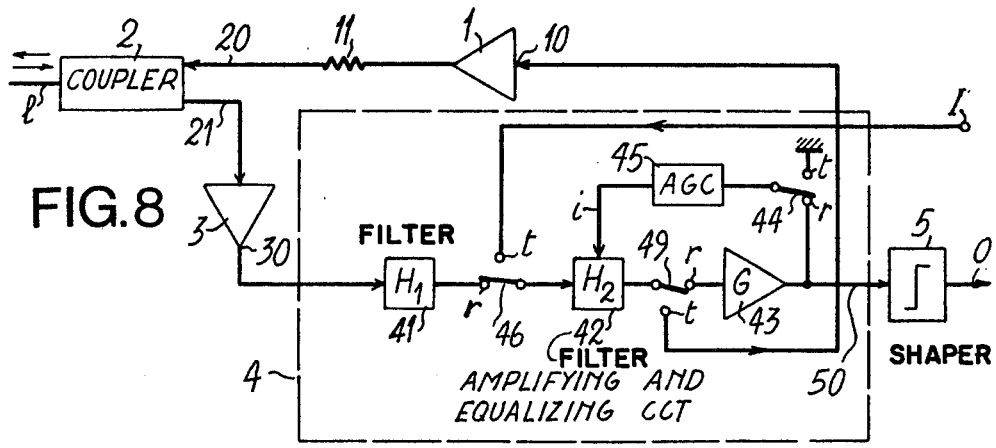

DEVICE FOR MINIMIZING FAR-END CROSSTALK BETWEEN HALF-DUPLEX DIGITAL TRANSMISSION LINES

BACKGROUND OF THE INVENTION

1. Field of the Invention

This invention relates to a device for minimizing far-end crosstalk between digital transmission lines and, more particularly, to such a device which is included in a half-duplex digital terminal or intermediate station which serves a section of a two-wire line whose other end is a grouping point of the digital transmission lines in a link.

2. Description of the Prior Art

The invention can be applied especially to a digital transmission link such as a transmission cable including a digital subscriber line, which operates in the half-duplex transmission mode. The range, i.e., effective transmission distance, of current subscriber lines is affected by crosstalk phenomena to a greater extent than constraints brought about by attenuation in the line which determines the ability of receiving means of the subscriber stations to detect and regenerate the signals received thereby. The range also affects the propagation times in the lines. One of the crosstalk components, namely near-end crosstalk, is reduced by the fact that one of the terminal stations, such as the local telephone exchange serving all the subscriber lines, synchronizes the transmissions of digit packets to the subscriber stations. The presence, however, of the other component, namely far-end crosstalk, is still felt and this produces a considerable disturbance which may be an error source when regenerating the signal in the receiving channel of the subscriber station.

Apparatus for minimizing the far-end crosstalk effect in a half-duplex digital line that is part of a cable is disclosed in the article by K. TANAKA et al., published in NTG FACHBERICHTE, Pages 86-90, Vol. 73, 1980, ISSLS 80 "The International Symposium on Subscriber Loops and Services", September 15-19, 1980, Munich, Federal Republic of Germany. This apparatus includes an equalizing amplifier in the transmitting channel of a line end station; the equalizing amplifier gain is controlled by an automatic gain control circuit of the equalizing amplifier in the receiving channel of the end station. The transmission and reception channels thus each comprises an equalizing amplifier.

OBJECT OF THE INVENTION

The main object of this invention is to eliminate practically all the far-end crosstalk effects between two or more transmission lines grouped together in one and the same link by employing filtering means already introduced into the receiving channel of a terminal or intermediate station of a half-duplex transmission line.

SUMMARY OF THE INVENTION

Accordingly, the far-end crosstalk minimizing device included in the half-duplex digital transmission station is linked to one end of the section of a line having an other end that is a grouping point for lines. The device has less attenuation than a predetermined maximum attenuation of the greatest line section. The device comprises equalizing means which is included in the receiving channel of said station and a filter having a transfer gain practically equal to the difference between the attenuation of said line section and said maximum attenuation. Switching means introduces said filter in series into the transmitting channel of said station during each transmission operation of the half-duplex cycle of said station.

In other words, the far-end crosstalk effect is reduced by slaving the signal transmitted, for example, from the subscriber station of the half-duplex transmission line, in order to optimize the signal-to-noise ratio upon reception at the exchange end. This optimization is achieved by homogenizing the relative frequency levels of the signals along the cable lines such that histograms of the relative levels represented by the signal spectral power densities are identical at least along adjacent line sections enveloped in the cable.

Using the filter of the receiving station channel advantageously infers only limited modifications to the existing terminal or intermediate stations.

Re-using this filter in the transmitting channel is achieved by switching means that are controlled in synchronism with the alternation of the connections between the transmitting and receiving station channels and the transmission line and that are, generally speaking, introduced behind the input junction and in front of the output junction of the adjustable filter of equalizing means of the receiving channel. During the transmission operation of the half-duplex cycle in the station, the filter is inserted in series in the transmitting channel, whilst the receiving channel is open. During the reception operation of the half-duplex cycle in the station, the filter is inserted in the receiving channel, as this is constant according to former art, whilst the transmitting channel is open.

Putting the invention into operation does not require any particular or matched components since the gain regulating means are the only components of that kind, governed by a feedback loop. Reutilization of the adjustable filter in the transmitting channel does not call for any adjustment and does not alter the transmission inversion time since the switching means are synchronous and controlled by the current alternation means.

Secondarily, regulating the relative level of the transmitted signal advantageously affords a drop in the disturbing crosstalk effect of the digital transmission lines on other lines in the same cable which are being used in a different transmission mode.

BRIEF DESCRIPTION OF THE DRAWING

Further advantages of the present invention will be apparent from the following more particular description of preferred embodiments of the invention as illustrated in the accompanying drawing, in which:

FIG. 1 is a schematical diagram of a digital transmission cable between a telephone exchange and telephone subscriber stations;

FIGS. 2A and 2B are temporal diagrams showing the known data packet exchange between a master station and two slave stations that are served by a short line and a maximum-range line respectively;

FIG. 3 is a diagram of the various spetral power densities along digital line sections grouped together in a cable and equipped at one line end with the device as per the invention;

FIG. 4 is a block-diagram of the elements relating to amplification and equalization in a digital half-duplex subscriber station according to the prior art;

FIGS. 7 and 8 are block-diagrams relating to FIG. 4 of the modification to be made in compliance with the invention.

DESCRIPTION OF THE PREFERRED EMBODIMENTS

Figure 5:
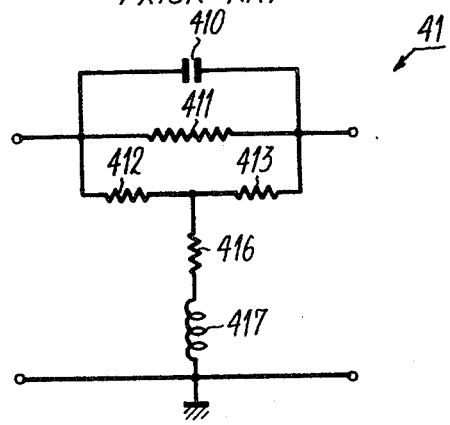
FIGS. 5 and 6 depict two known filters in the amplifying and equalizing circuit of a prior art station.

FIG. 1 is a diagram of a prior art link operating in the half-duplex transmission mode. The transmission medium of this link is a cable including N two-wire telephone lines $l_1$ to $l_N$. All these lines have a common end which is linked to the same terminal station E. The other ends of the lines $l_1$ to $l_N$ are connected to remote stations $st_1$ to $st_N$ at distances $d_1$ to $d_N$, respectively. In practice, a cable of this nature corresponds for instance to a subscriber telephone cable which serves a number N of subscriber stations $st_1$ to $st_N$ from a local telephone exchange E.

Reference is now be made to FIGS. 2A and 2B for a brief recap on the principle of half-duplex digital transmission.

The telephone exchange E is considered as being a "master" station since it imposes the half-duplex transmission cycle duration T between the station E and a station st. The duration T of the half-duplex cycle is defined between the transmission start time of a packet such as $a_1$ along the so-called "forward" transmission direction—from master station E to a so-called "slave" station st—and the transmission start time of the next packet $a_2$ from the master station E, as depicted in FIG. 2A. Between these two times, the station E receives a packet $b_1$ which is transmitted from the slave station st in the opposite direction, i.e. in the backward transmission direction from the slave station st to the master station E. The half-duplex transmission implies that a second packet $a_2$ is emitted by the master station E after the first packet $a_1$ has been transmitted by the master station A and received by the slave station st and after a first packet $b_1$ has been transmitted by the slave station st and received by the master station E. It is assumed in what follows that the packets all have the same number of digits and hence, the same duration equal to t. tp designates the propagation time in a line l which has a length d. In this case, the following condition prevails regardless of the length d, and hence tp:

$$T \geq 2(t + tp + tg_E + tg_{st})$$

where $tg_E$ and $tg_{st}$ are substantially equal guard times and which are required for inversion of the transmission directions in the master and slave stations E and st. As known, the line digit rate must be equal to at least twice a given station digit rate.

FIG. 2A is a temporal diagram relating to a telephone line l in the cable having a length d less than the range or maximum length D of such a line beyond which the line would be too long for the signal received to be detected, amplified and suitably regenerated. In this case, the time interval between the reception end for a packet $b_1$ and the transmission start for a following packet $a_2$ in the master station E is greater than the guard time $tg_E$.

FIG. 2B is a temporal diagram which relates to a telephone line designated by L, having a length equal to the maximum range D corresponding to the maximum propagation time TP. The reception end for a packet $b_1$ in the master station E is then followed by a time interval which is equal to the guard time $tg_E$ prior to the transmission of the following packet $a_2$.

As known, the transmissions of packets a along the forward direction from the station E are synchronous and in phase for all the lines $l_1$ to $l_N$ in the cable or link. In view of the fact that each slave station st transmits a packet b after the same guard time $tg_{st}$ in response to receiving a packet a, it can be seen that the transmission of packets b by the slave stations $st_1$ to $st_N$ are not synchronous as a result of the propagation times $tp_1$ to $tp_N$ in the respective lines $l_1$ to $l_N$ being different.

It is a known fact that synchronism is primarily required for limiting on the crosstalk and, more especially, near-end crosstalk phenomena. Near-end crosstalk is, to recap, that crosstalk which occurs between two adjacent lines conveying signals in opposite directions. In reference to FIGS. 2A and 2B, it can be seen that, along the forward transmission direction, all the transmitting means of the master station E transmit digit packets simultaneously over a duration less than the half-period T/2. These transmissions can not disturb reception of packets b since the receiving means of the master station E are not active during this half-period.

The same can be said of the slave stations. The transmission of a packet, such as $b_1$, by the slave station ST associated with a line L having the maximum length D (FIG. 2B) cannot disturb reception of a packet $a_1$ by the slave station associated with a short line l having a length such that $d < D$. The transmission of packet $b_1$ along the long line L (FIG. 2B) is triggered well after packet $a_1$ has been received in the slave station st associated with the short line l (FIG. 2A). Despite the temporal overlap occuring between packets $a_1$ and $b_1$, due to the reception and transmission times in the slave stations respectively associated with the long and short lines, the disturbing energy coming from the short line arrives after packet $a_1$ has been received in the station associated with the long line with a receiving means that is then inactive.

On the other hand, the half-duplex transmission cable is not immune to the far-end crosstalk phenomenon. Far-end crosstalk occurs between two lines conveying signals in the same direction.

With reference still being made to FIGS. 2A and 2B, as a result of the synchronism of the transmitting means in master station E, only the disturbing-disturbed line couples along the backward transmission direction are to be taken into consideration. It can be seen, for example, that the packet $b_1$ which is transmitted from the slave station st associated with a line having a short length d, arrives at master station E in temporal overlap with the reception of the packet $b_1$ which is transmitted from a slave station ST associated with a line L having greater length $D > d$. The signal transmitted by the slave station ST undergoes an attenuation which can be related to a drop in the signal-to-noise ratio $R_f$. This is expressed by the following equation, for a baseband frequency f:

$$R_f(f) = E_f(f) - (\alpha_D(f) - \alpha_d(f))$$

where all the terms are decibels, $E_f$ designates the signal-to-far-end crosstalk ratio and $\alpha_D$ and $\alpha_d$ designate the attenuation factors (positive numbers) which are due to the long line L and the short line l respectively. This signal attenuation can be quite considerable. In the case, for example, of a disturbing-disturbed couple such that $d = 0.6$ and $D = 4$ km, the difference between the attenuation factors $(\alpha_d(f) - \alpha_D(f))$ reaches approximately 30 dB.

In the invention, the device for combatting the adverse effect of far-end crosstalk involves equalizing the relative levels of signals in the cable lines at any given point therein along one and the same transmission direction.

This relative level equalization operation must be performed for the digital signals which are transmitted in the backward direction from the grouping point G of the cable lines. If the spectral power density relative to the signal transmitted by the slave station ST associated with the long line L is given as $S_o(f)$, the spectral power density $S_G(f)$ of this signal when it reaches the grouping point G, i.e. when it becomes disturbed by the disturbing signal transmitted by the station st associated with the short line, is expressed by the following equation:

$$S_G(f) = S_o(f) - (\alpha_D(f) - \alpha_d(f)).$$

A necessary condition for the histograms of relative levels to be identical on each line L, l, is that the station st transmits a signal such that at the point G, the signal spectral power density along the line l be equal to the preceding equation. If it is supposed that the station st is practically in front of the point G, then said station st must transmit a signal of spectral power density $S_o(f)$ such that:

$$S_o(f) = S_o(f) - (\alpha_D(f) - \alpha_d(f)).$$

This is achieved by filtering the initial signal $S_o(f)$ in the station st through a filter which has a transfer gain equal to $(\alpha_d(f) - \alpha_D(f))$. If it is assumed that the lines have like transmission characteristics, i.e. have line conductors having equal cross-sections of the same conductive material, then the preceding transfer function corresponds to the attenuation in a line section of length $D - d$.

The contribution of this filtering can be generalized to cover a digital transmission link which comprises a plurality of lines $l_1$ to $l_N$ which run together from a grouping point G of a cable, as depicted in FIG. 3. Each line $l_n$, where n varies from 1 to N, has a line section of length $x_n$ upstream of the point G along the transmission direction in question from the station st to the cable. If X is the longest of the line sections $x_1$ to $x_N$, or if $\alpha_X$ indicates the predetermined greatest attenuation factor undergone by a signal received at G in comparison to the attenuation factors brought about by line sections $x_1$ to $x_N$, then each transmitting means in a station $st_n$ must comprise a filter with a respective transfer gain equal to $\alpha_{xn} - \alpha_X$, where $\alpha_{xn}$ is the attenuation factor due to the section of length $x_n$ served by the station $st_n$. The signal spectral power density at the grouping point G along each line $l_n$ is thus:

$$S_o + \alpha_{xn} - \alpha_X - \alpha_{xn} = S_o - \alpha_X$$

For a maximum line section X, the respective station ST, such as $st_1$ on FIG. 3, does not include a filter.

It will be noted that each station $st_n$ can be a repeater in a very long line. In this case, the regenerating circuit corresponding to the transmission direction in question $st_n$ to G comprises at the output a filter which has the transfer function equal to $\alpha_{xn} - \alpha_X$ and which converts the generated signal $S_o$ into a signal $S_o + \alpha_{xn} - \alpha_X$.

The design and the calculation of a filter such as this are similar to those of the equalization filter which is inserted in the amplifying and equalizing circuit of a digital repeater. This filter generally comprises one or more inductive, capacitive and resistive T-networks that are perhaps preceded by one or more resistive T-networks.

According to one aspect of the invention, the filter having a transfer gain of $\alpha_{xn} - \alpha_X$ or $\alpha_d - \alpha_D$ is the filter already present in the receiving means of a slave station $st_n$ of a known kind.

FIG. 4 is a diagram of the transmitting and receiving means for a half-duplex telephone subscriber station st according to the prior art, which is associated with a telephone two-wire line l.

The transmitting channel of the station st further comprises a transmission amplifier 1 having an input 10 connected to an input terminal I that receives the digital signal to be transmitted to the master station E. The output of the amplifier 1 is connected to the transmitting channel 20 of a hybrid coupler 2, via a line terminating impedance 11. The coupler 2 is of the differential transformer type, for example, and is connected to the line l.

The other channel of the station st receives the signal which travels via the line l and which is transmitted from the master station E. This receiving channel comprises a receiver amplifier 3 having an input connected to receiving channel 21 of the hybrid coupler 2, and an amplifying and equalizing circuit 4 having an output connected to the input 50 of a reshaping circuit 5 having an output 0 that restores the received regenerated digital signals.

The amplifying and equalizing circuit 4 comprises in series, between the output 30 of the receiver amplifier 3 and the input of the reshaping circuit 5, an input switch 40, a first filter 41, a second filter 42 and an amplifier 43 with constant gain G. The automatic gain control loop in circuit 4 comprises a switch 44 that is interconnected between the output of the amplifier 43 and the input of an automatic gain control (AGC) circuit 45 with an output that controls the transfer gain ($H_2$) of the second filter 42.

For transmission operation t of the half-duplex cycle, when a packet b is transmitted in the backward direction by the station st, via elements 1, 11 and 2, the receiving channel is rendered inactive by setting switches 40 and 44 to the reference tension or to ground (moving the contact positions of switches 40 and 44 opposite to those illustrated in FIG. 4). In the reception operation r, switches 40 and 44 assume the positions as indicated in FIG. 4 and permit the equalization of the digital signal received.

For a line l of given length d, the overall transfer gain of the amplifying and equalizing circuit 4 is approximately $N(f) + \alpha_d(f)$. Indeed, the role of equalizing is, on the one hand, to compensate for the distortions introduced as a result of routing the signal along the line and which are represented by the transfer function $-\alpha_d(f)$ and, on the other hand, to introduce filtering intended for maximizing the signal-to-noise ratio whilst minimizing the intersymbol interferences by means of a Nyquist filter which has a transfer function $N(f)$.

The practical prior art filter 41 illustrated in FIG. 5 presents a constant transfer function $H_1(f)$ which is obtained through a T-network. This network includes a capacitor 410 and a resistor 411 which are in parallel with two identical series resistors 412 and 413. The common terminal of resistors 412 and 413 is connected to a resistor 416 in series with an inductor 417, which together form the vertical arm of T.

Figure 6:
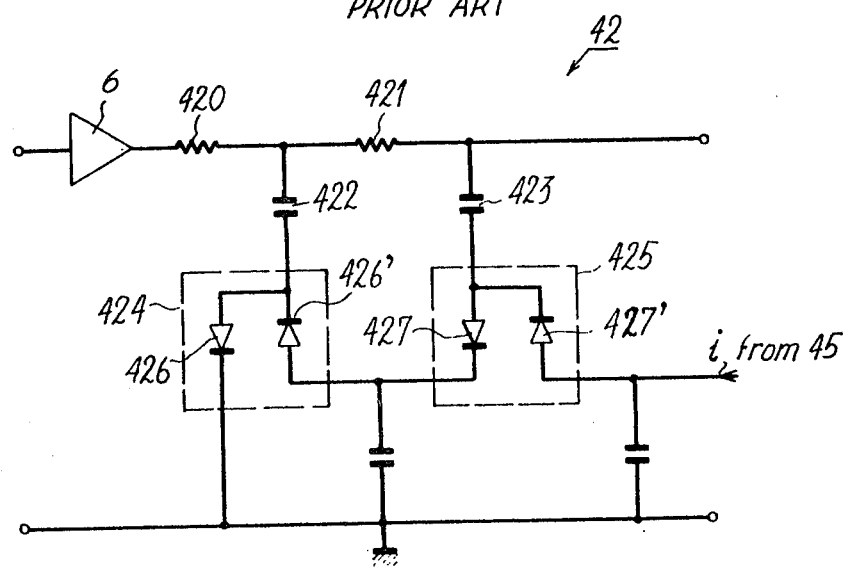

The prior art filter 42 is shown in FIG. 6 as comprising first and second low-pass type cells. The first and second cell respectively comprise a resistor 420, 421 and a capacitor 422, 423 which is in series with a variable resistor 424, 425. Each of variable resistors 424 and 425 respectively includes a doublet of oppositely-poled clamping diodes 426, 426', and 427, 427', the conductances of which vary in terms of the current i which passes through them and which is delivered from the output of the automatic gain control circuit 45. The circuit 45 is made up conventionally of a level-comparator detector. The input of filter 42 can be preceded by an impedance matching circuit 6.

The element values in the first filter 41 are chosen for equalizing the maximum length D of the lines. The element values of the second filter 42 are determined to compensate for the equalization of each cable length at the maximum length D, which corresponds to conductances of variable elements 424 and 425 tending towards infinity. In other words, this amounts to selectively equalizing the incoming signal levels frequency-wise to compensate for the transfer function effect of the lines.

Consequently, the adjustable filter 42 having a transfer function $H_2(f)$ behaves like an attenuator having an attenuation factor which varies in terms of a control parameter. The limits of the variation range of this parameter correspond to a maximum attenuation that is applicable for a line having a zero length, and to a minimum attenuation that is applicable for a line having a maximum length D.

In this way, for the maximum length D configuration, the transfer gains of second filter 42 and amplifying and equalizing circuit 4 can be written:

$$20 \log (H_2(f)) = 0$$

$$N(f) + \alpha_D(f) = 20 \log (H_1(f)) + 0 + G$$

whence the transfer gain of first filter 41 is deduced as:

$$A_1(f) = 20 \log (H_1(f)) = N(f) + \alpha_D(f) - G$$

For a configuration of any length d, the equation becomes:

$$N(f) + \alpha_d(f) = 20 \log (H_1(f)) + 20 \log (H_2(f)) + G$$

By replacing the value of transfer gain $20 \log (H_1(f))$ in the above equation, it turns out that transfer gain $A_2(f)$ of second filter 42 may be written as:

$$A_2(f) = 20 \log (H_2(f)) = \alpha_d(f) - \alpha_D(f)$$

and corresponds to the transfer function sought for minimizing the far-end crosstalk effects. In accordance with the invention, switching means 40 and 44 in a known amplifying and equalizing circuit are modified such that second filter 42 can be used in the station st during the transmission operation.

FIGS. 7 and 8 are schematically diagrams of two embodiments of the switching means as per the invention in a station st. In these diagrams, the same reference numbers designate the same elements as those in FIG. 4. In the reception operation r of the half-duplex cycle, the received signal passes through the same amplifying and filtering circuits in FIGS. 4, 7 and 8.

In FIG. 7, the input switch 40 is replaced by a switch 46 having one stationary contact connected to the output of first filter 41 and a moving contact is connected to the input of second filter 42. The other stationary contact of switch 46 connected via an attenuator 47 to the input I of signals to be transmitted. This attenuator 47 has a constant attenuation factor equal to $-G$ so as to compensate for the amplification of gain G which is produced in amplifier 43 in the transmission operation t. Connection terminal 50 which is common to each of the output of amplifier 43, one of the stationary contacts of switch 44 and the input terminal of reshaping circuit 5, is also connected to one of the stationary contacts of a third switch 48 having a moving contact connected to input 10 of transmission amplifier 1. The other stationary contact of switch 48 is applied to ground referenced voltage.

As a result, according to FIG. 7, during the transmission operation t of the half-duplex cycle in the station st, the signal to be transmitted passes from the terminal I across elements 47, 46, 42, 43, 48, 1, 11 and 2 successively. During the reception operation r of the half-duplex cycle in the station st, switch 48 applies the ground referenced voltage to input 10 of transmission amplifier 1, which is disconnected from the output of amplifying and equalizing circuit 4, whilst switch 46 connects filters 41 and 42 and disconnects the output of attenuator 47 and the input of filter 42.

In FIG. 8, attenuator 47 and switch 48 are eliminated compared to FIG. 7. The switch 48 is replaced by a switch 49. During reception operation r, the moving contact of switch 48 connects the output of filter 42 to the input of amplifier 43 whilst switch 46 connects the output of filter 41 to the input of filter 42. During the transmission operation t, switch 49 connects the output of filter 42 directly to input 10 of transmission amplifier 1 whilst switch 46 connects terminal I directly to the input of filter 42. As a result, in the transmission operation t, the digital signal to be transmitted routed from terminal I through elements 46, 42, 49, 1, 11 and 2 successively.

What I claim is:

1. Device for minimizing far-end crosstalk between digital transmission lines, said device being included in a half-duplex digital transmission station linked to one end of a section of one of said lines, said one line section having another end that is a grouping point for said lines, and an attenuation less than a pre-determined maximum attenuation of a section of one of the lines having the greatest attenuation between a half-duplex digital transmission station and said grouping point, said device comprising equalizing means included in a receiving channel of said station linked to said one end, said equalizing means including a filter having a transfer gain substantially equal to the difference between the attenuation of said line section connected to said one end and said maximum attenuation, and switching means for connecting said filter in series into a transmitting channel of said station during each transmission operation of the half-duplex cycle of said station.

2. Device as claimed in claim 1 wherein said equalizing means comprises an amplifier having a constant gain G, and the amplifier having an input connected to be responsive to the output of said filter in said receiving channel, and an attenuator having an attenuation factor $-G$, the attenuator having an input connected to be responsive to an input of said transmitting channel, and said switching means comprising first switching means at the input of said filter and second switching means at the output of said amplifier, said first and second switching means connecting in series said attenuator, said filter and said amplifier in said transmitting channel and opening said receiving channel during said transmission operation and connecting in series said filter and said amplifier into said receiving channel and opening said transmitting channel during the reception operation of said half-duplex cycle.

3. Device as claimed in claim 1 wherein said switching means comprises first switching means at the input of said filter and second switching means at the output of said filter, said first and second switching means introducing in series said filter into said transmitting channel and opening said receiving channel during said transmission operation and introducing in series said filter into said receiving channel and opening said transmitting channel during the receiving operation of said half-duplex cycle.

4. In a transmitter and receiver of a half-duplex station of a data transmission system including a plurality of such stations each connected via a different line section to a terminal station, the different line sections having differing attenuations such that one of the line sections has a greater attenuation than any of the other line sections, the transmitter of a particular station being responsive to a first input signal derived at a particular station and supplying the signal derived at the particular station to the line section connected to the particular station, the receiver at a particular station being responsive to a second input signal supplied to the particular station by the line section connected to the particular station, each half duplex station including circuitry for minimizing cross talk between the line sections at the terminal station, a coupler connected to the line section connected to the particular station, the coupler having input and output terminals, first means for coupling the second signal as derived at the coupler output terminal to an output terminal of the particular station while the particular station is in a receive mode, second means for coupling the first signal to the coupler input terminal while the particular station is in a transmit mode, the second means having a constant transfer function with an attenuation factor substantially equal to the difference between the attenuations of the line section connected to the particular station and the line section having the greatest attenuation so that the attenuation between each station and the terminal station is the same while each station is in the transmit mode.

5. The station of claim 4 wherein the first and second means include a common variable response filter, the first means including a fixed gain amplifier cascaded with the filter, the first means including an automatic gain control circuit responsive to an output signal of the amplifier for controlling the filter response, the second means including: means for maintaining the filter response constant and means for effectively eliminating the effect of the amplifier gain on the signal coupled from the filter to the input terminal of the coupler.

6. The station of claim 5 wherein the means for effectively eliminating includes an attenuator connected between a source of the first input signal and the coupler input terminal so the first means does not include the attenuator and the attenuator is series connected with the amplifier, the attenuator having an attenuation factor equal to the amplifier gain factor so the combined gain of the series connected attenuator and amplifier is unity.

7. The station of claim 5 wherein the amplifier has an input responsive to an output of the filter, and the means for effectively eliminating includes switch means for bypassing the amplifier.

8. A data transmission system comprising plurality of half duplex stations, a terminal station and a different line section connected between each half duplex station and the terminal station, each half duplex station including a transmitter and receiver, the different line sections having differing attenuations such that one of the line sections has a greater attenuation than any of the other line sections, the transmitter of a particular station being responsive to a first input signal derived at the particular station and supplying the signal derived at the particular station to the line section connected to the particular station, the receiver at a particular station being responsive to a second input signal supplied to the particular station by the line section connected to the particular station, each half duplex station including circuitry for minimizing cross talk between the line sections at the terminal station, each station k of the system including: a coupler connected to the line section connected to station k, the coupler having input and output terminals, first means for coupling the second signal as derived at the coupler output terminal to an output terminal to station k while station k is in a receive mode, second means for coupling the first signal to the coupler input terminal while station k is in a transmit mode, the second means having a constant transfer function with an attenuation factor substantially equal to the difference between the attenuations of the line section connected to station k and the line section having the greatest attenuation so that the attenuation between each station and the terminal station is the same while each station is in the transmit mode.

9. The system of claim 8 wherein the first and second means include a common variable response filter, the first means including a fixed gain amplifier cascaded with the filter, the first means including an automatic gain control circuit responsive to an output signal of the amplifier for controlling the filter response, the second means including: means for maintaining the filter response constant and means for effectively eliminating the effect of the amplifier gain on the signal coupled from the filter to the input terminal of the coupler.

10. The system of claim 9 wherein the means for effectively eliminating includes an attenuator connected between a source of the first input signal and the coupler input terminal so the first means does not include the attenuator and the attenuator is series connected with the amplifier, the attenuator having an attenuation factor equal to the amplifier gain factor so the combined gain of the series connected attenuator and amplifier is unity.

11. The system of claim 9 wherein the amplifier has an input responsive to an output of the filter, and the means for effectively eliminating includes switch means for bypassing the amplifier.

* * * * *